(12) United States Patent
Paschalakis et al.

(10) Patent No.: US 9,454,710 B2
(45) Date of Patent: Sep. 27, 2016

(54) METHOD FOR TRANSFORMING AN IMAGE DESCRIPTOR BASED ON A GRADIENT HISTOGRAM AND RELATIVE IMAGE PROCESSING APPARATUS

(71) Applicant: SISVEL TECHNOLOGY S.R.L.

(72) Inventors: Stavros Paschalakis, Guildford (GB); Miroslaw Bober, Guildford (GB)

(73) Assignee: SISVEL TECHNOLOGY S.R.L. (IT)

( * ) Notice: Subject to any disclaimer, the term of this patent is extended or adjusted under 35 U.S.C. 154(b) by 0 days.

(21) Appl. No.: 14/410,768

(22) PCT Filed: Jul. 1, 2013

(86) PCT No.: PCT/EP2013/063874
§ 371 (c)(1),
(2) Date: Dec. 23, 2014

(87) PCT Pub. No.: WO2014/009198
PCT Pub. Date: Jan. 16, 2014

(65) Prior Publication Data
US 2015/0332116 A1 Nov. 19, 2015

(30) Foreign Application Priority Data
Jul. 9, 2012 (IT) ............... TO2012A0602

(51) Int. Cl.
*G06K 9/00* (2006.01)
*G06K 9/46* (2006.01)
(Continued)

(52) U.S. Cl.
CPC ............... *G06K 9/4642* (2013.01); *G06K 9/46* (2013.01); *G06K 9/4671* (2013.01); *G06K 9/52* (2013.01);
(Continued)

(58) Field of Classification Search
USPC ........ 382/168, 169, 195, 209, 251, 305; 1/1; 235/462.01, 462.16; 424/277.1
See application file for complete search history.

(56) References Cited

U.S. PATENT DOCUMENTS

| | | | | |
|---|---|---|---|---|
| 7,006,714 B2* | 2/2006 | Kasutani | ........... | G06F 17/30256 382/209 |
| 7,664,333 B2* | 2/2010 | Kasutani | ........... | G06F 17/30256 382/209 |
| 8,428,397 B1* | 4/2013 | Brandt | ................. | G06K 9/6272 382/195 |

FOREIGN PATENT DOCUMENTS

| | | |
|---|---|---|
| CN | 101794395 A | 8/2010 |
| TW | 201142718 A1 | 12/2011 |

(Continued)

OTHER PUBLICATIONS

Taiwanese Office Action date Mar. 10, 2015, issued in Taiwanese Application No. 102123706, filed Jul. 2, 2013.
(Continued)

*Primary Examiner* — Anh Do
(74) *Attorney, Agent, or Firm* — Workman Nydegger

(57) ABSTRACT

A method for transforming an image descriptor, based on a gradient histogram (h) having a plurality of histogram bins ($h_i$), into a transformed gradient histogram descriptor (v) including a set of values ($v_j$), wherein it is provided the step of applying at least one criterium for calculating the set of values ($v_j$), at least one criterium having a location criterium of the histogram bins ($h_i$). The invention also relates to an image processing device suitable for carrying out the method.

17 Claims, 13 Drawing Sheets

(51) Int. Cl.
*G06K 9/52* (2006.01)
*G06T 7/40* (2006.01)

(52) U.S. Cl.
CPC ....... *G06T 7/403* (2013.01); *G06K 2009/4666* (2013.01); *G06T 2207/20012* (2013.01); *G06T 2207/20021* (2013.01)

(56) References Cited

FOREIGN PATENT DOCUMENTS

| | | |
|---|---|---|
| TW | 201143358 A1 | 12/2011 |
| WO | 2011/071467 A1 | 6/2011 |
| WO | 2011/085277 A1 | 7/2011 |

OTHER PUBLICATIONS

International Search Report dated Aug. 7, 2013, issued in PCT Application No. PCT/EP2013/063874, filed Jul. 1, 2013.
Mehmet Ftrat Vural et al., *Registration of Multispectral Satellite Images with Orientation-Restricted SIFT*, Geoscience and Remote Sensing Symposium, 2009 IEEE International, Jul. 12, 2009, pp. 111-123.
B.S. Manjunath et al., *Color and Texture Descriptors*, IEEE Transactions on Circuits and Systems for Video Technology, vol. 11, No. 6, Jun 2001, pp. 703-715.
George Paschos et al., *Histogram Ratio Features for Color Texture Classification*, Pattern Recognition Letters, vol. 24, Jan. 1, 2003, pp. 309-314.
Rui Ma et al., *MI-SIFT: Mirror and Inversion Invariant Generalization for SIFT Descriptor*, CIVR, ACM, Jul. 5, 2010, pp. 228-235.

* cited by examiner

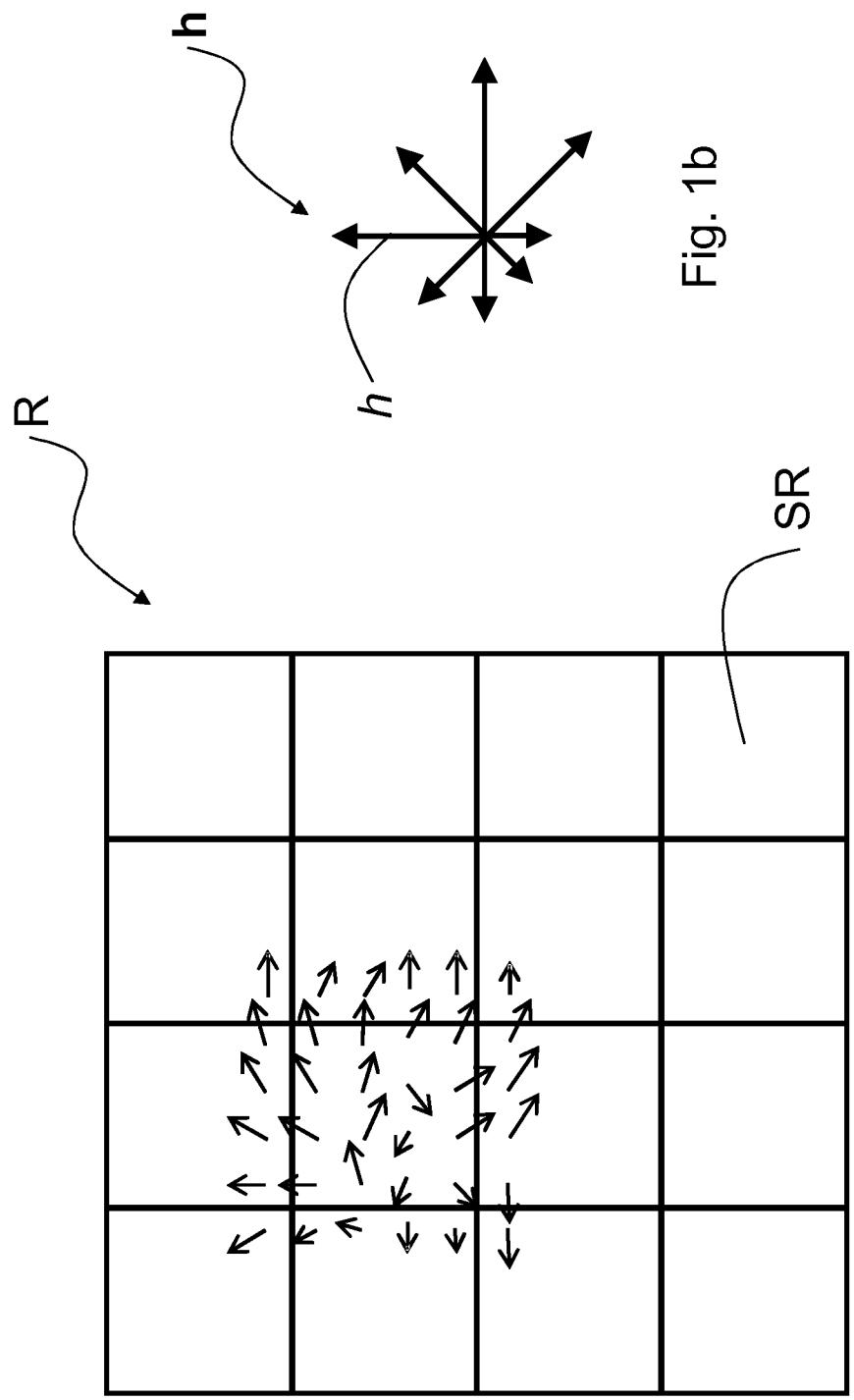

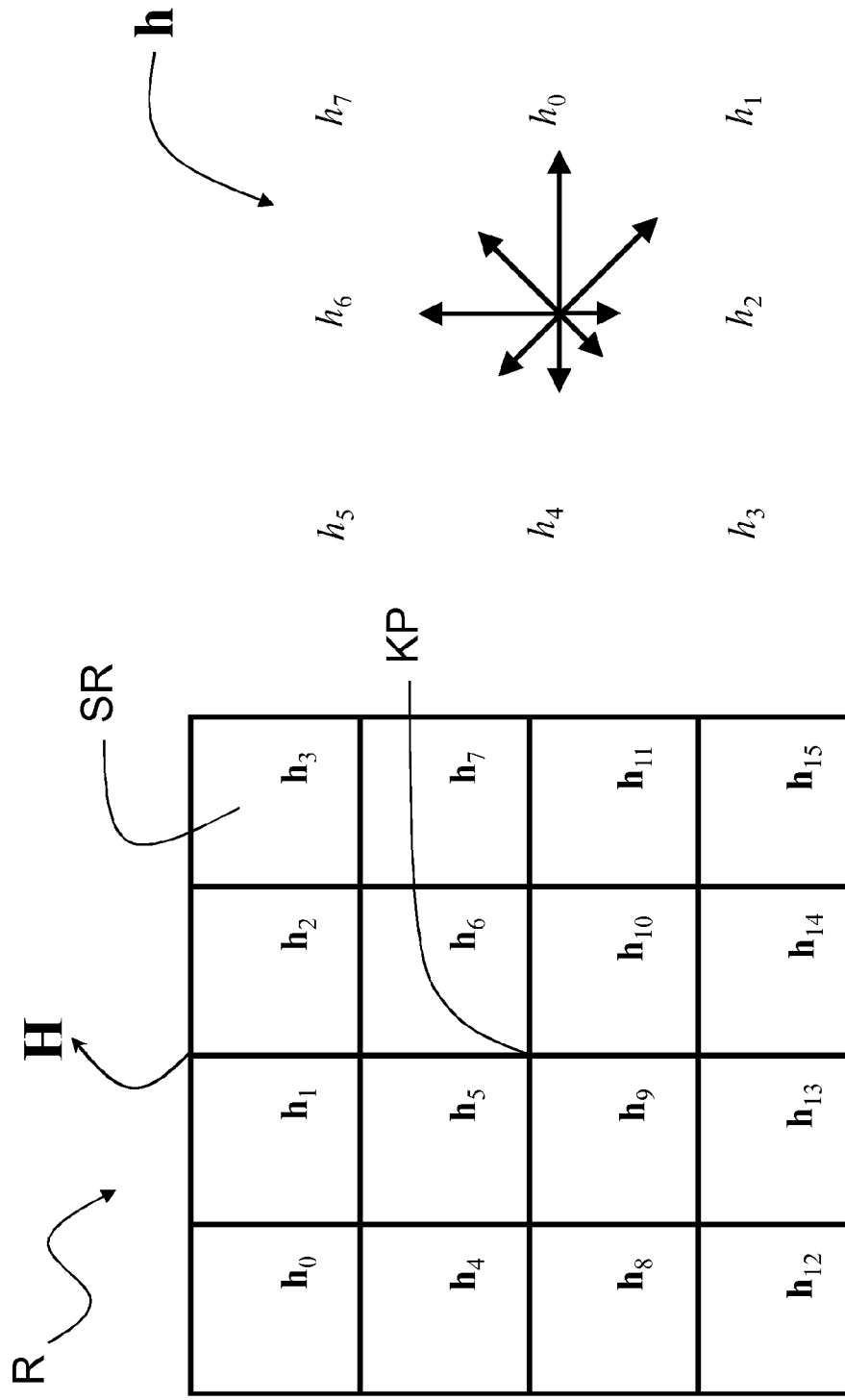

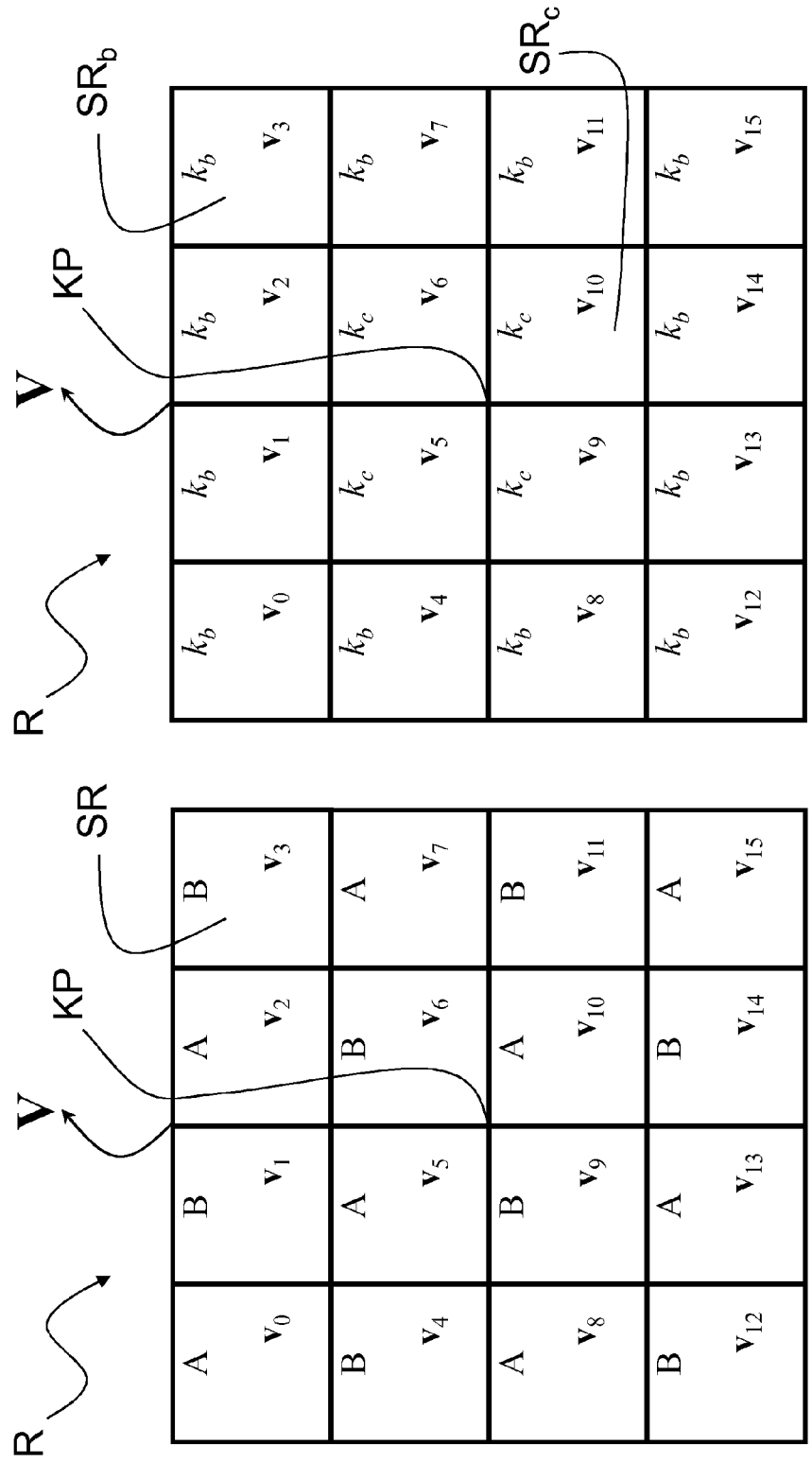

METHOD FOR TRANSFORMING AN IMAGE DESCRIPTOR BASED ON A GRADIENT HISTOGRAM AND RELATIVE IMAGE PROCESSING APPARATUS

BACKGROUND OF THE INVENTION

1. Field of the Invention

This invention relates to the computation of robust, discriminative, scalable and compact image descriptors.

More in particular, the present invention refers to image descriptors computed in local regions around image interest points by computing histograms of gradients of subregions within said local regions.

2. Present State of the Art

Image descriptors have found wide applicability in many computer vision applications including object recognition, content-based image retrieval, and image registration, to name a few. One of the most widely known examples of this class of image descriptors is the Scale Invariant Feature Transform (SIFT) descriptor.

Briefly, with the SIFT method, local image descriptors are formed as follows: first, a search across multiple images scales and locations is performed to identify and localise stable image keypoints that are invariant to scale and orientation; then, for each keypoint, one or more dominant orientations are determined based on local image gradients, allowing the subsequent local descriptor computation to be performed relative to the assigned orientation, scale and location of each keypoint, thus achieving invariance to these transformations.

Then, local image descriptors around keypoints are formed as follows: first, gradient magnitude and orientation information is calculated at image sample points in a region around the keypoint; then, these samples are accumulated into orientation histograms summarizing the contents over n×n subregions. By way of illustration only, an example of a keypoint descriptor is shown in FIGS. 1a and 1b, where FIG. 1a shows a subdivision of the local region R into 4×4 subregions SR and FIG. 1b shows a subdivision of the 360° range of orientations into eight bins h for each orientation histogram h, with the length of each arrow corresponding to the magnitude of that histogram entry.

Thus, a local image descriptor as illustrated in FIG. 1a has 4×4×8=128 elements. The SIFT method is presented in greater detail in David G. Lowe, "Distinctive image features from scale-invariant keypoints", International Journal of Computer Vision, 60, 2 (2004), pp. 91-110.

A number of alternatives and variations of the SIFT method exist, employing different mechanisms for the detection of stable image keypoints, different approaches to the subdivision of the local region around keypoints and different approaches to the computation of subregion gradient histograms. For example, FIGS. 2a and 2b respectively show log-polar spatial subdivisions characteristic of other techniques like the Gradient Location Orientation Histogram (GLOH) described in K. Mikolajczyk and C. Schmid, "A performance evaluation of local descriptors", IEEE Transactions of Pattern Analysis and Machine Intelligence 27(10):1615-1630, and the Uncompressed Histogram of Gradients (UHoG) described in Chandrasekhar et al., "Compressed Histogram of Gradients: A Low-Bitrate Descriptor", International Journal on Computer Vision, Vol. 94, No. 5, May 2011, as alternatives to the Cartesian spatial subdivision employed in the SIFT method.

As another example, FIGS. 3a and 3b show approaches for the computation of gradient histograms based on a subdivision of the 2-dimensional space of the x and y components of the gradients into bins, characteristic of UHoG, as an alternative to the subdivision of the 360° range of gradient orientations into bins which is employed in the SIFT method.

The above mentioned prior art techniques are considered here only by way of example of techniques producing image descriptors based on which the present invention performs computation of robust, discriminative, scalable and compact image descriptors.

Although such image descriptors have found wide applicability in many computer vision applications as discussed earlier, their storage and transmission costs, as defined by their size in bytes, are commonly considered high in certain application areas. This is because, although the size of a local image descriptor for a keypoint in an image may be relatively low, the entire image descriptor will comprise hundreds of such keypoints and associated local descriptors, meaning the entire image descriptor can have a size comparable to a JPEG compressed version of the actual image from which it is extracted. One such application area where this level of descriptor size is considered problematic is visual search using mobile terminals. Although different architectures are feasible in this application area, one typical architecture entails capture of an image of an object of interest by a mobile terminal client such as a mobile phone, automatic extraction of an image descriptor by the client, transmission of the image descriptor over a wireless communication network to a server which will process the image descriptor and provide an appropriate response, such as the identity or additional information regarding the object of interest, and a return of said response to the client. Thus, it is obvious that minimisation of the amount of information transmitted from the client to the server over the wireless network is desirable. For the benefit of such applications, there has been a significant amount of development in the compression of such image descriptors.

The simplest approach towards compressing a histogram of gradient based keypoint descriptor is by scalar quantisation of the histogram bin values, which means reducing the number of bits used in the representation of each bin value individually. In practice, this approach is not commonly used because it is difficult to achieve very high compression rates without significantly compromising the discriminative power of the descriptor. For example, encoding of SIFT descriptor histogram bins with eight bits per bin is commonly used, but results in image descriptors whose size in bytes is commonly considered too large for transmission over wireless networks. On the other hand, scalar quantisation to just a few, for example just one or two, bits per bin has been found to compromise the discriminative power of the image descriptor.

Therefore, more complex compression schemes have been proposed. A review of such schemes is presented in V. Chandrasekhar et al., "Survey of SIFT compression schemes", Proceedings of International Conference on Pattern Recognition (ICPR), Istanbul, Turkey, August 2010.

Briefly, schemes revolving around vector quantisation, whereby the bin values are jointly quantised by mapping them to one of a finite number of representative vector centroids, have been particularly popular and investigated in various forms, such as tree-structured and product vector quantisation. The drawback of such approaches is that they entail a relatively high computational complexity and quite significant memory requirements, from hundreds of kilobytes to several megabytes or more, for the storage of the centroids, the number of which can range from thousands to millions, and the determination of which also requires a computationally complex training phase.

Schemes revolving around type coding have also been thoroughly investigated, whereby bin values are again jointly quantised by forming a uniform lattice of types within the space containing all possible input vectors and, for any given input vector, encoding it by the index of the type which is closest to it. The memory requirements of such approaches are reduced compared to vector quantisation approaches, but it has also been found that the resultant compressed descriptors do not compare well to vector quantised descriptors in terms of recognition performance at high compression rates. Overall, the computational costs associated with type coding are significantly higher than for simple scalar quantisation.

Other compression schemes utilise known dimensionality reduction methods, such as PCA, on keypoint descriptors, for example 128-dimensional SIFT keypoint descriptors, followed by scalar quantisation of the resultant dimensions. A key problem with such approaches is that they entail high computational complexity and a high risk of overtraining.

To sum up, existing approaches to the compression of histogram of gradient based descriptors and the generation of robust, discriminative, scalable and compact image descriptors exhibit certain drawbacks.

A simple approach such as scalar quantisation of the descriptor elements has the benefit of very low computational complexity and memory requirements, but has been found to compromise the discriminative power of the descriptors at high compression rates.

More complex approaches have been shown to achieve better performance at high compression rates, but suffer different drawbacks. Vector quantisation approaches have significantly increased computational complexity and memory requirements. Type coding approaches entail increased complexity and, while not burdened by the memory requirements of the vector quantisation approaches, have also been found to underperform compared to such approaches. Furthermore, neither vector quantisation nor type coding approaches are well suited to dimensionality reduction in the compressed domain. Approaches based on known dimensionality reduction techniques, such as PCA, have also been employed, but also suffer from high computational complexity and a high risk of overtraining.

SUMMARY OF THE INVENTION

It is therefore an object of the present invention to indicate a method for transforming an image descriptor based on a gradient histogram which allows to reduce the size of the image descriptor.

It is a further object of the present invention to indicate a method for transforming an image descriptor, based on a gradient histogram, allowing to reduce the costs of its storing and transmission, in particular over a wireless network in mobile terminal applications.

It is a further object of the present invention to indicate a method for transforming an image descriptor based on a gradient histogram allowing to reduce the size of an image descriptor constituted by a plurality of gradient histograms relating to subregions surrounding an image keypoint.

These and other objects of the invention are achieved through a method for transforming an image descriptor based on a gradient histogram and a relative image processing apparatus as claimed in the appended claims, which are an integral part of the present description.

In synthesis, the present invention relates to the calculation of robust, discriminative, scalable and compact image descriptors from image descriptors employing histograms of gradients based on the transformation of said histograms of gradients, where said transformation captures the salient and robust information contained therein in the form of the shape of the distributions and the relationship among their bin values. More specifically, the present invention transforms histograms of gradients by calculating values corresponding to relations between histogram bins.

The method according to the present invention also relates to the calculation of robust, discriminative, scalable and compact image descriptors, based on different approaches of handling the histogram of gradients related to the subregions surrounding an image keypoint.

Further features of the invention are set out in the appended claims, which are intended as an integral part of the present description.

BRIEF DESCRIPTION OF THE DRAWINGS

The above objects will become more apparent from the following detailed description of the method for transforming an image descriptor based on a gradient histogram, with particular reference to the annexed drawings, wherein:

FIGS. 1a and 1b show an example of a prior art keypoint descriptor;

FIGS. 4a and 4b show an example of a keypoint descriptor according to the invention;

FIGS. 5 to 7 show different ways of handling histograms of gradients corresponding to subregions surrounding an image keypoint;

FIG. 15 illustrates the processing of an image descriptor according to the invention by using the gradient histogram subdivision scheme of FIG. 3a;

DETAILED DESCRIPTION OF THE PREFERRED EMBODIMENTS

Figure 2B:
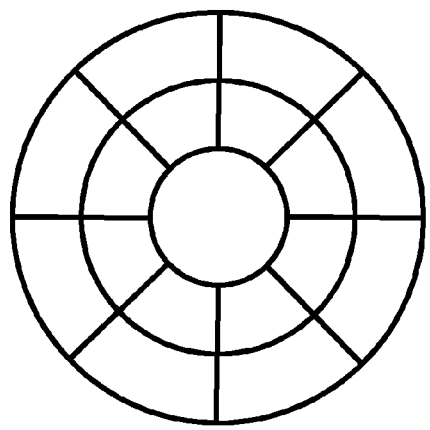
FIGS. 2a and 2b show spatial subdivision schemes respectively used in GLOH and UHoG prior art techniques.
Figure 3B:
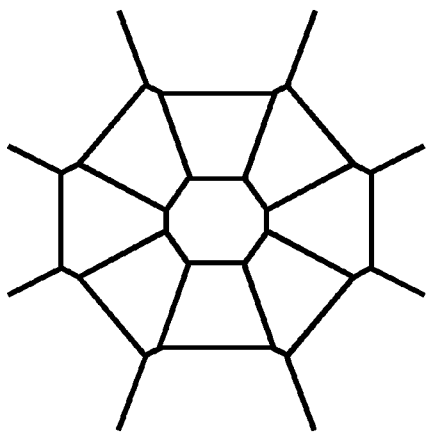
FIGS. 3a and 3b show approaches for the computation of gradient histograms of the UHoG technique.
Figure 2A:
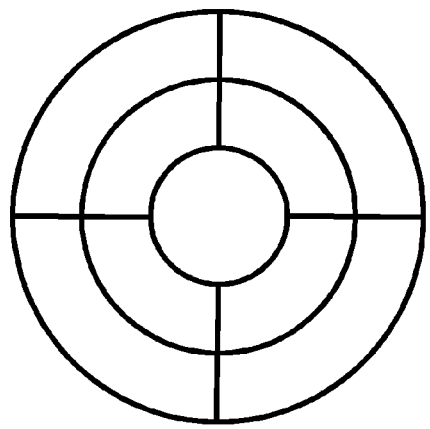
Figure 3A:
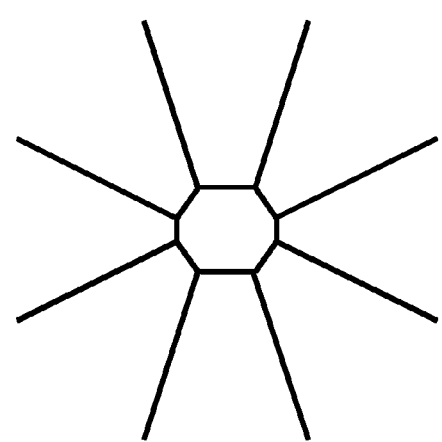

By way of example and without any limitation, aspects of the present invention are presented for the computation of robust, discriminative, scalable and compact image descriptors from an image descriptor, in particular a SIFT image descriptor as illustrated in FIG. 4, with FIG. 4a illustrating an example subdivision of the local region R into 4×4 subregions SR and FIG. 4b illustrating an example 8-bin gradient histogram for a subregion.

Let h denote the gradient histogram of FIG. 4b, with bins $h_i$ where i is the bin index with i=0 . . . n−1. A gradient histogram transformation according to the invention calculates values $v_j$ corresponding to relations between gradient histogram bins.

The bins among which values corresponding to relations are calculated may be selected according to their location or proximity which, in the case of the gradient histogram of FIG. 4b, translates to their angular separation.

By way of example of values corresponding to relations between gradient histogram bins, neighbouring bin differences, as shown in (1) below, capture the overall shape and extrema locations of the histogram.

$$v_0 = h_0 - h_1$$
$$v_1 = h_1 - h_2$$
$$v_2 = h_2 - h_3$$
$$v_3 = h_3 - h_4$$
$$v_4 = h_4 - h_5$$
$$v_5 = h_5 - h_6$$
$$v_6 = h_6 - h_7$$
$$v_7 = h_7 - h_0 \quad (1)$$

Differences between bins which correspond to gradients with an angular difference of 90° as shown in (2) below, or more generally as near as 90° as the gradient histogram characteristics and bin granularity allow, capture information about the relation between gradients at substantially right angles to each other.

$$v_0 = h_0 - h_2$$
$$v_1 = h_1 - h_3$$
$$v_2 = h_2 - h_4$$
$$v_3 = h_3 - h_5$$
$$v_4 = h_4 - h_6$$
$$v_5 = h_5 - h_7$$
$$v_6 = h_6 - h_0$$
$$v_7 = h_7 - h_1 \quad (2)$$

Differences between bins which correspond to gradients with an angular difference of 180° as shown in (3) below, or more generally as near as 180° as the gradient histogram characteristics and bin granularity allow, capture important high level information about the relation between gradients within orientations, such as within the horizontal orientation and within the vertical orientation.

$$v_0 = h_0 - h_4$$
$$v_1 = h_1 - h_5$$
$$v_2 = h_2 - h_6$$
$$v_3 = h_3 - h_7 \quad (3)$$

The functions shown in (4) below combine more than two gradient bins and capture information about the relation of gradients between specific orientations, such as the horizontal gradients in either direction against the vertical gradients in either direction.

$$v_0 = (h_0 + h_4) - (h_2 + h_6)$$
$$v_1 = (h_1 + h_5) - (h_3 + h_7) \quad (4)$$

The functions shown in (5) below combine all the bins of the gradient histogram to produce discriminating values which are representative of the shape of the entire histogram.

$$v_0 = (h_0 + h_2 + h_4 + h_6) - (h_1 + h_3 + h_5 + h_7)$$
$$v_1 = (h_0 + h_1 + h_2 + h_3) - (h_4 + h_5 + h_6 + h_7) \quad (5)$$

The bins among which values corresponding to relations are calculated may also be selected according to different criteria. For example, the bins among which values corresponding to relations are calculated may be selected so as to increase the discriminative power of the resultant values. Such functions, for example, may take the form of the functions shown in (6) below $$v_0 = (h_0 + h_2 + h_4 + h_6) - (h_1 + h_3 + h_5 + h_7)$$
$$v_1 = (h_0 + h_1 + h_2 + h_3) - (h_4 + h_5 + h_6 + h_7)$$
$$v_2 = (h_0 + h_4) - (h_2 + h_6)$$
$$v_3 = (h_1 + h_5) - (h_3 + h_7) \quad (6)$$

As another example, the bins among which values corresponding to relations are calculated may be selected through a random selection process. Examples of such functions are shown in (7) below $$v_0 = 2h_0 - h_3 - h_6$$
$$v_1 = h_0 + h_1 + h_5 - 3h_7 \quad (7)$$

As another example of a histogram transformation, the set of functions shown in (8) below constitute an invertible transform whereby $v_7$ is a value representative of the total histogram count.

$$v_0 = h_0 - h_1$$
$$v_1 = h_1 - h_2$$
$$v_2 = h_2 - h_3$$
$$v_3 = h_3 - h_4$$
$$v_4 = h_4 - h_5$$
$$v_5 = h_5 - h_6$$
$$v_6 = h_6 - h_7$$
$$v_7 = h_0 + h_1 + h_2 + h_3 + h_4 + h_5 + h_6 + h_7 \quad (8)$$

The functions of (1)-(8) show the relations between gradient histogram bins calculated as sums or differences between bins or differences between sums of bins, but this is not restrictive and different linear or non-linear operations may be employed, such as ratios between bins or ratios between sums of bins or ratios between products of bins or differences between products of bins and so on.

In general, a gradient histogram may be transformed by calculating values $v_j$ corresponding to relations between gradient histogram bins, the selection of said gradient histogram bins being dependant on one or more criteria, such as their proximity or the discriminative power of the resultant values, or a combination of criteria thereof.

Furthermore, when bins are selected according to their proximity, a gradient histogram may be transformed by calculating values $v_j$ corresponding to relations between gradient histogram bins which exhibit a single angular separation, for example based on relations between neighbouring bins only as in (1) or based on relations between 180° separated bins only as in (3) and so on. Alternatively, a gradient histogram may also be transformed by calculating values $v_j$ corresponding to relations between gradient histogram bins which exhibit a plurality of angular separations, for example based on some relations as shown in (1), some relations as shown in (2), and so on. Overall, the transformation selection process is quite important, as it balances the amount of a specific type of information against the mixture of different types of information against the dimensionality k of the resultant transformed descriptor compared to the dimensionality n of the gradient histogram, which may be related to each other by k=n or k<n or k>n.

Hereinafter, the values $v_j$ with j=0 . . . k−1 calculated from the transformation of a gradient histogram h will be collectively referred to as the transformed gradient histogram descriptor v of k elements.

As seen earlier, a single image descriptor H may comprise multiple histograms of gradients $h_p$, each corresponding to a subregion SR of the local region R around the image keypoint KP. FIG. 4a illustrates an example of subdivision of the local region R into 4×4 subregions SR, each described by a histogram of gradients $h_p$. Such an image descriptor may be transformed to a new image descriptor V by the individual transformation of the gradient histogram of each subregion SR to a transformed gradient histogram descriptor $v_p$ as described above.

The gradient histogram transformation process described above has numerous advantages in producing a compact image descriptor. A first advantage is that, through the appropriate selection of the transformation, the process described above makes it possible to encode salient shape characteristics and discriminative information of a gradient histogram using fewer elements than the original gradient histogram, for example by replacing eight gradient bins with the combined six elements of (3) and (4) shown earlier, resulting in a smaller image descriptor which is still very successful in establishing or verifying visual correspondences and achieving a high recognition performance.

Another advantage is that, unlike the original gradient histogram, the transformed gradient histogram descriptor is suitable for compression by simple coarse scalar quantisation, whereby each descriptor element is individually quantised to just a few bits, even as low as one or two bits, which in effect provide only a coarse measure of the relation between specific gradient bins or the dominance of specific bins over other specific bins. However, said coarse measure still provides a robust and discriminative compact image descriptor which is successful in establishing or verifying visual correspondences and achieves higher recognition performance than the original gradient histogram based descriptor under the same scalar quantisation conditions and also under more complex compression schemes such as vector quantisation and type coding.

For instance, using scalar quantisation, values $v_j$ are individually quantised to q levels, for example with q=2 or q=3 or q=4, etc., although this is not restrictive and different numbers of quantisation levels may be used to achieve the desired compactness in the resultant descriptor. This quantisation may be performed by comparing the value of each value $v_j$ to a set of thresholds. There are numerous options in deciding the quantisation thresholds. The quantisation thresholds may be determined, for example, by the uniform division of the dynamic range of each $v_j$. Alternatively, the quantisation thresholds may be set so as to achieve a specific long-term distribution of values among the q quantisation levels, for example a uniform distribution. Furthermore, the quantisation thresholds may be the same for all values $v_j$ calculated in all subregions SR, or they may be the same for the same index j across all subregions SR, or they may be the same for each subregion SR across all j, or they may be different for each subregion SR and each index j.

Thus, the gradient histogram transformation process described above eliminates the need for complex compression schemes such as the ones seen earlier, with associated reduction in overall computational complexity and memory requirements, while attaining similar or improved performance characteristics.

A consequent third advantage is that the dimensionality of the transformed gradient histogram descriptor is highly scalable not only before compression but also after compression, and may be easily further reduced if required by an application or the transmission channel characteristics by simply eliminating one or more of its individually quantised elements, which is not easily achieved with more complex compression techniques such as vector quantisation or type coding.

Meanwhile, the individual transformation and compression of the gradient histogram of each subregion as described above is highly advantageous since it facilitates scalability of the entire transformed image descriptor, if required, by simply eliminating one or more the individually transformed and quantised subregion histograms.

However, it must also be stressed that the transformed gradient histogram descriptor described above is not incompatible with the more complex compression schemes discussed earlier or any compression schemes which are applicable to the original histogram of gradient based descriptor and it may still be used in conjunction with any such compression schemes if desired.

As seen earlier, a single histogram of gradient based image descriptor H may comprise multiple histograms of gradients $h_p$ each corresponding to a subregion SR of the local region R around the image keypoint KP and such an image descriptor H may be transformed by the individual transformation of the gradient histogram of each subregion SR as described above. More specifically, each subregion gradient histogram may be transformed in an identical manner to the other subregion gradient histograms but, alternatively, at least one subregion gradient histogram may be transformed differently to other subregion gradient histograms.

For example, in the context of transforming some subregion histograms differently to other subregion histograms, a requirement may be imposed in the image descriptor transformation process that the transformation functions of any histogram of gradients must differ at least partially from the transformation functions employed in at least some of its spatially neighbouring histograms of gradients. This is illustrated in FIG. 5.

More specifically, FIG. 5A and FIG. 5B refer to sets of transform functions which are completely or partially different to each other. For example, taking the functions of (1) as A and the functions of (2) as B results in completely different sets of functions, while taking the functions of (3) and the even-numbered elements from (1) as A, and the functions of (3) and the odd-numbered elements from (1) as B results in partially different sets of functions. In FIG. 5, the transformation functions A and B are applied to the subregion histograms so that for each subregion histogram transformed by A (or alternately B) its four horizontal and vertical neighbouring histograms are transformed by B (or alternately A). While this utilisation of multiple sets of transformation functions increases the implementation complexity slightly, it has a significant advantage over the utilisation of the same transformation functions in all the subregion histograms. It is known to those skilled in the art that with SIFT descriptors, as well as other histogram of gradient based image descriptors, neighbouring gradient histograms, particularly horizontally or vertically connected, exhibit significant correlation, which is also maintained in the transformed gradient histogram descriptors. Applying the same transformation in such neighbouring histograms in combination with any subsequent coarse quantisation, results in an increased probability of neighbouring histograms having identical elements. This problem is alleviated by the utilisation of different transformation functions as described above, which increases the entropy and consequently the discriminative power of the descriptor.

As another example in the context of transforming some subregion histograms differently to other subregion histograms, the transformed gradient histogram descriptors of some subregions may comprise a different number of elements to the transformed gradient histogram descriptors of other subregions according to certain deciding factors, such as the subregion location relative to the centre or the region around the keypoint.

FIG. 6 illustrates one example of this, where the central four subregions $SR_c$, directly surrounding the image keypoint KP, are transformed as described above to $k_c$ elements while the twelve boundary subregions $SR_b$ are transformed as described above to $k_b$ elements, with $k_c > k_b$. Therefore, this increases the information content of the central subregions $SR_c$ relative to the overall transformed images descriptor, said subregions $SR_c$ being commonly considered by those skilled in the art as more important in establishing or verifying visual correspondences.

As another example in the context of transforming some subregion histograms differently to other subregion histograms, the transformed gradient histogram descriptors of some subregions may be compressed differently to the transformed gradient histogram descriptors of other subregions according to certain deciding factors, such as the subregion location relative to the centre of the region around the keypoint.

Figure 7:
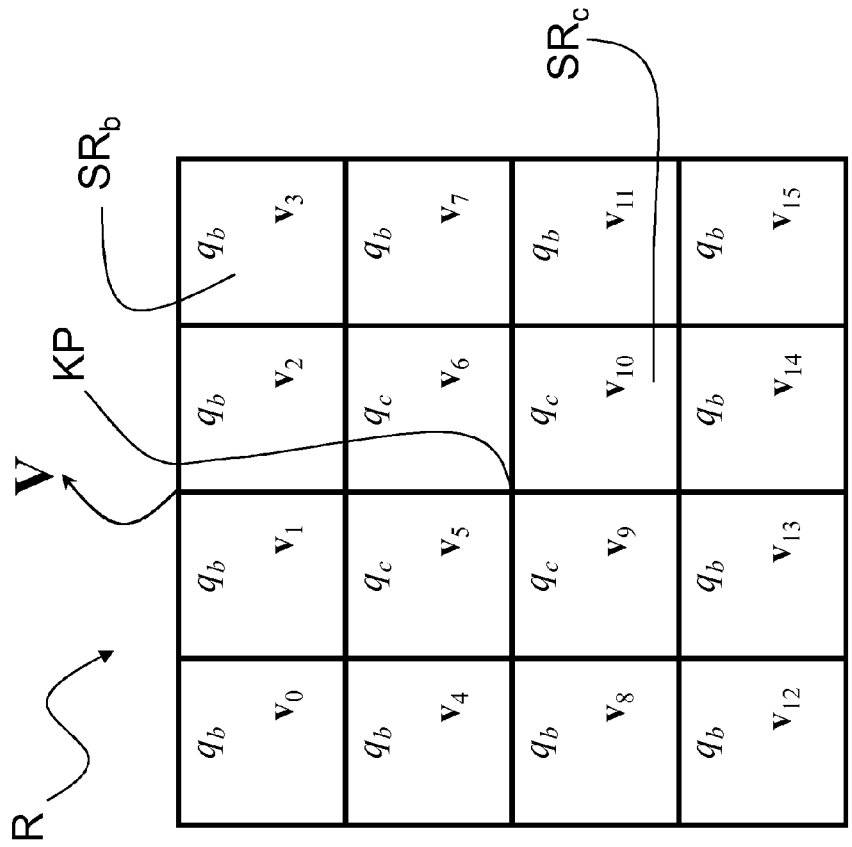

FIG. 7 illustrates one example of this, where the central four subregions $SR_c$, directly surrounding the image keypoint KP, are transformed as described above and quantised to $q_c$ levels while the twelve boundary subregions $SR_b$ are transformed as described above and quantised to $q_b$ levels, with $q_c > q_b$. Therefore, this increases the representation accuracy of the central subregions $SR_c$ within the overall transformed image descriptor, said subregions $SR_c$ being commonly considered by those skilled in the art as more important in establishing or verifying visual correspondences.

Furthermore, different compression characteristics may also apply only to specific elements of transformed gradient histogram descriptors according to certain deciding factors, such as the transformation function of the specific elements or their underlying statistics.

Overall, factors such as the selection of the appropriate transformation functions for different subregions and the selection of appropriate compression parameters for different subregions and/or subregion elements are quite important, as they control the information content and discriminative power of the descriptor against its complexity and storage/transmission cost.

Embodiments of the present invention are now described with the aid of FIG. 8 to FIG. 13.

First Embodiment

Figure 8:
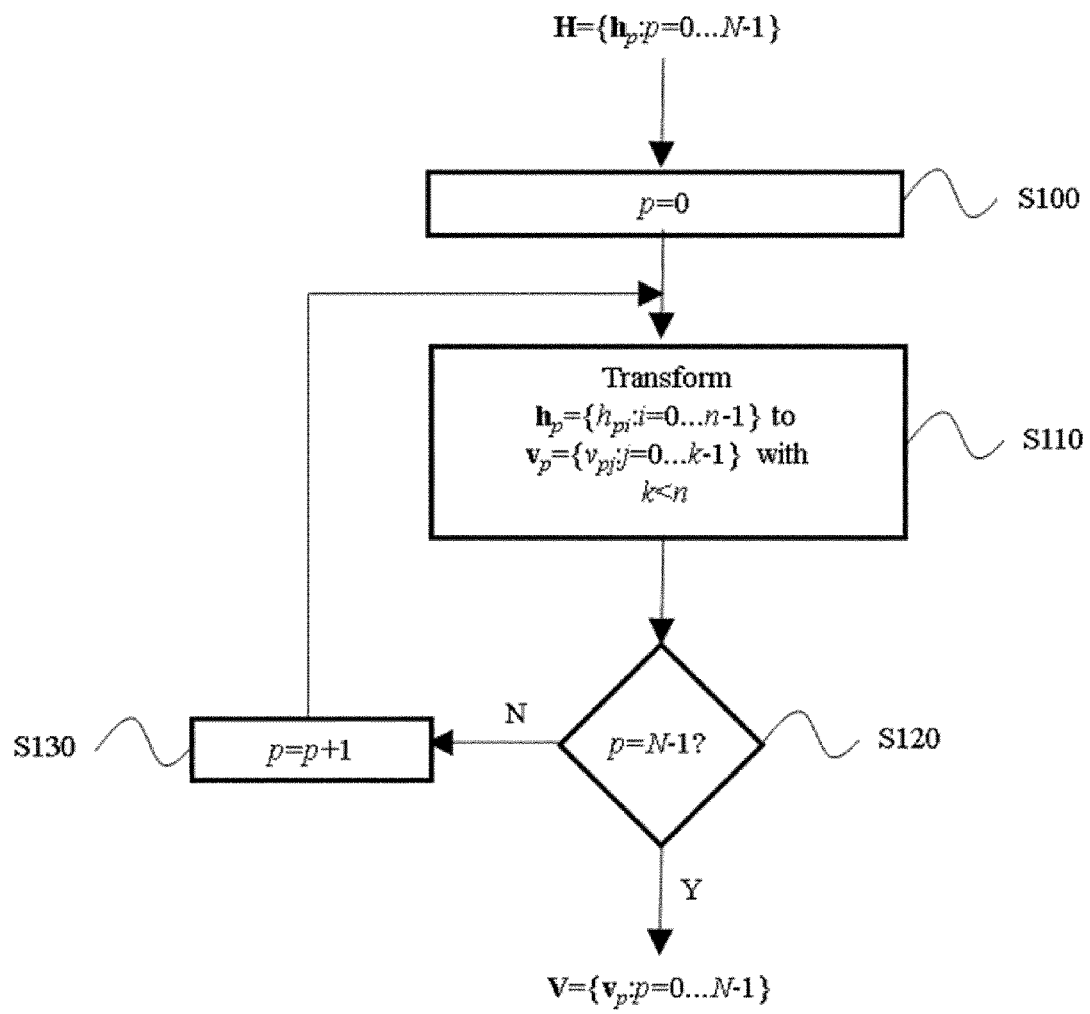
FIGS. 8 to 13 represent flow diagrams according to six embodiments of the present invention.

A first embodiment of the invention is illustrated in FIG. 8, where a gradient histogram based descriptor H comprising gradient histograms $h_p$, for example according to FIG. 4, is processed by transforming each gradient histogram $h_p$ so as to reduce its dimensionality by calculating values corresponding to relations between gradient histogram bins selected according to their proximity.

More specifically, in FIG. 8, each histogram $h_p$ with p= 0 ... N−1 (N=16) is processed in turn. In step S100, p is set 0.

Then, in step S110, histogram $h_p$ of n bins (n=8) is transformed to descriptor $v_p$ of k elements (k=4), with k<n, by a set of functions selected to capture the relations between bins which have a single angular separation, namely the functions of (9), which capture the relations between neighbouring bins.

$$v_0 = h_0 - h_1$$
$$v_1 = h_2 - h_3$$
$$v_2 = h_4 - h_5$$
$$v_3 = h_6 - h_7 \quad (9)$$

Alternatively, the functions of (9) may be replaced by different functions which capture the relations between bins which have another single angular separation, such as functions which capture the relations between bins separated by 90°, or functions which result in a descriptor $v_p$ with a different number of elements k, but still with k<n.

Then, in step S120 the value of p is examined and, if it is equal to the index of the last histogram in H, the process ends, otherwise it is incremented by 1 in step S130 and processing returns to step S110.

Thus, the resultant descriptor V encodes salient shape characteristics and discriminative information of H using significantly fewer elements than H, resulting in a smaller descriptor which is still very successful in establishing or verifying visual correspondences and achieving a high recognition performance.

Optionally, the values of the individual elements of V may be scaled and shifted as appropriate, for example in order to map them to non-negative values and/or to a specific dynamic range, for example 8-bit.

The subsequent processing of the resultant descriptors, in order to determine whether two descriptors have been extracted from the same keypoint in different images and to establish visual correspondences between images, is beyond the scope of the invention and may proceed in an analogous fashion as for the original gradient histogram descriptors, for example as described in David G. Lowe, "Distinctive image features from scale-invariant keypoints," International Journal of Computer Vision, 60, 2 (2004), pp. 91-110, or in any other suitable fashion.

Second Embodiment

Figure 9:
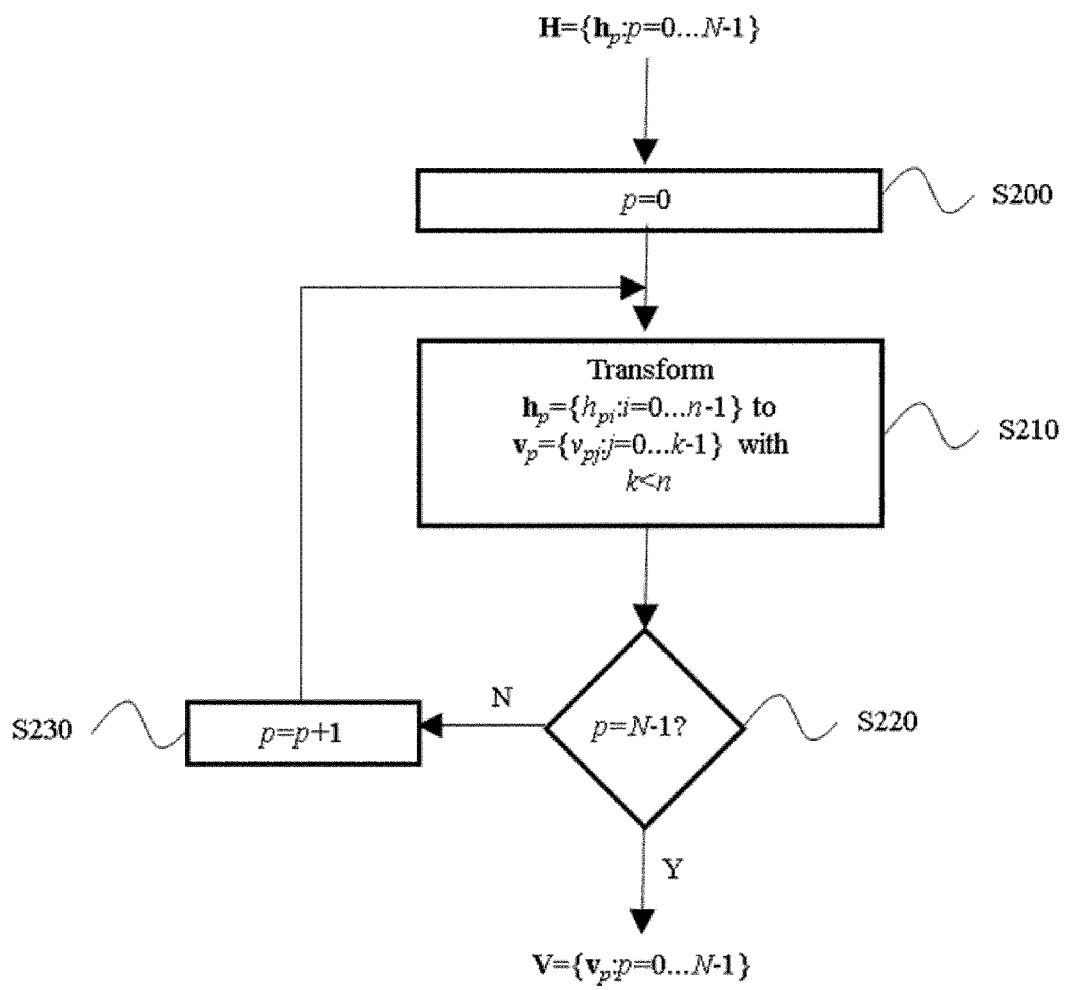

A second embodiment of the invention is illustrated in FIG. 9, where a gradient histogram based descriptor H comprising gradient histograms $h_p$, for example according to FIG. 4, is processed by transforming each gradient histogram $h_p$ so as to reduce its dimensionality by calculating values corresponding to relations between gradient histogram bins selected according to a plurality of criteria with respect to their proximity.

More specifically, in FIG. 9, each histogram $h_p$ with p= 0 ... N−1 (N=16) is processed in turn. In step S200, p is set 0.

Then, in step S210, histogram $h_p$ of n bins (n=8) is transformed to descriptor $v_p$ of k elements (k=6), with k<n, by a set of functions selected to capture the relations between bins which have a plurality of angular separations, namely the functions of (10), which capture the relations between neighbouring bins and the relations between bins separated by 180°.

$$v_0 = h_0 - h_1$$
$$v_1 = h_2 - h_3$$
$$v_2 = h_4 - h_5$$
$$v_3 = h_6 - h_7$$
$$v_4 = h_0 - h_4$$
$$v_5 = h_2 - h_6 \quad (10)$$

Alternatively, the functions of (10) may be replaced by different functions which capture the relations between bins which have another plurality of angular separations, such as functions which capture the relations between bins separated by 90° and the relations between bins separated by 180°, or functions which result in a descriptor $v_p$ with a different number of elements k, but still with k<n.

Then, in step S220 the value of p is examined and, if it is equal to the index of the last histogram in H, the process ends, otherwise it is incremented by 1 in step S230 and processing returns to step S210.

Thus, the resultant descriptor V encodes different types of salient shape characteristics and discriminative information of H using fewer elements than H, resulting in a smaller descriptor which is still very successful in establishing or verifying visual correspondences and achieving a high recognition performance.

The subsequent processing of the resultant descriptor may then proceed in an analogous fashion to the first embodiment.

Third Embodiment

Figure 10:
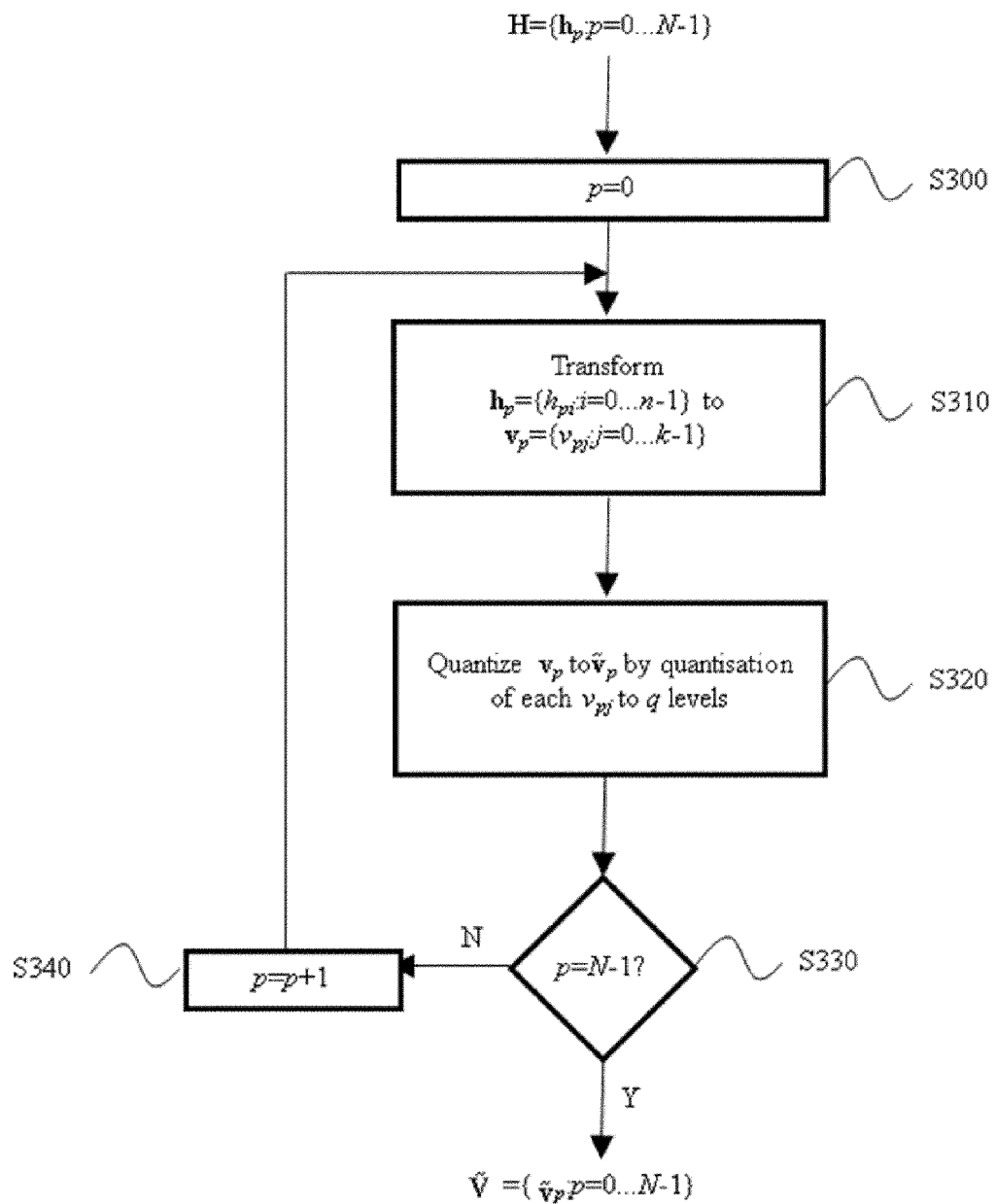

A third embodiment of the invention is illustrated in FIG. 10, where a gradient histogram based descriptor H comprising gradient histograms $h_p$, for example according to FIG. 4, is processed by transforming each gradient histogram $h_p$ by calculating values corresponding to relations between gradient histogram bins selected according to a plurality of criteria with respect to their proximity.

More specifically, in FIG. 10, each histogram $h_p$ with p= 0 ... N−1 (N=16) is processed in turn. In step S300, p is set 0.

Then, in step S310, histogram $h_p$ of n bins (n=8) is transformed to descriptor $v_p$ of k elements (k=8), by a set of functions selected to capture the relations between bins which have a plurality of angular separations, namely the functions of (11).

$$v_0 = h_2 - h_6$$
$$v_1 = h_3 - h_7$$
$$v_2 = h_0 - h_1$$
$$v_3 = h_2 - h_3$$
$$v_4 = h_4 - h_5$$
$$v_5 = h_6 - h_7$$
$$v_6 = (h_0 + h_4) - (h_2 + h_6)$$
$$v_7 = (h_0 + h_2 + h_4 + h_6) - (h_1 + h_3 + h_5 + h_7) \quad (11)$$

Alternatively, the functions of (11) may be replaced by different functions which capture the relations between bins which have another plurality of angular separations, or functions which result in a descriptor $v_p$ with a different number of elements k, with k=n or k<n or k>n.

Then, in step S320, each element of the descriptor $v_p$ of k elements is individually quantised to q levels, giving the quantised descriptor $\tilde{v}_p$. In this embodiment we set q=3, although this is not restrictive and different numbers of quantisation levels may be used to achieve the desired compactness in the resultant descriptor, for example q=2, q=4, and so on. This quantisation may be performed by comparing the value of each element $v_{pj}$ to a set of thresholds.

There are numerous options in deciding the quantisation thresholds. The quantisation thresholds may be determined, for example, by the uniform division of the dynamic range of $v_{pj}$. Alternatively, the quantisation thresholds may be set so as to achieve a specific long-term distribution of values among the q quantisation levels, for example a uniform distribution. Furthermore, the quantisation thresholds may be the same for all elements $v_{pj}$, or they may be the same for the same index j across all p, or they may be the same for the same index p across all j, or they may be different for each $v_{pj}$.

Then, in step S330 the value of p is examined and, if it is equal to the index of the last histogram in H, the process ends, otherwise it is incremented by 1 in step S340 and processing returns to step S310.

Clearly, alternative implementations may change the order or certain operations as appropriate compared to FIG. 10 without deviating from the scope of the invention, for example by first calculating the entire descriptor V and then proceeding with the quantisation to generate the quantised descriptor $\tilde{V}$.

Thus, the resultant descriptor $\tilde{V}$, encodes different types of salient shape characteristics and discriminative information of H. The coarse scalar quantisation, whereby each descriptor element is individually quantised to just a few levels which provide only a coarse measure of the relation between specific gradient bins or the dominance of specific bins over other specific bins, results in a robust and discriminative compact image descriptor which is successful in establishing or verifying visual correspondences and achieves higher recognition performance than the original gradient histogram based descriptor under the same scalar quantisation conditions and also under more complex compression schemes.

The subsequent processing of the resultant descriptor may then proceed in an analogous fashion to the previous embodiments.

Fourth Embodiment

Figure 11:
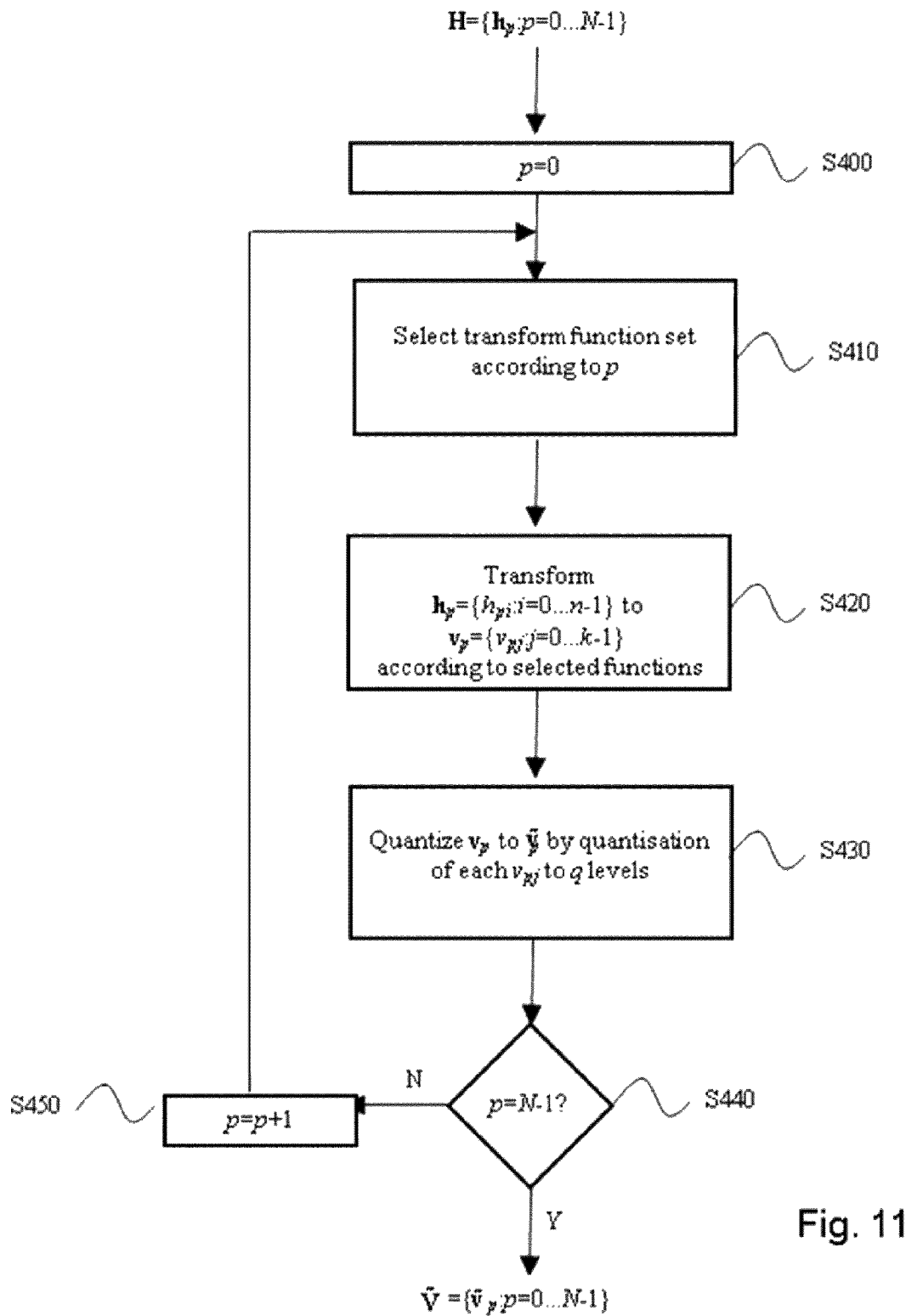

A fourth embodiment of the invention is illustrated in FIG. 11, where a gradient histogram based descriptor H comprising gradient histograms $h_p$, for example according to FIG. 4, is processed by transforming each gradient histogram $h_p$ with a set of transform functions which exhibits differences to the sets of transform functions used in the processing of some of the gradient histograms which are neighbouring $h_p$.

More specifically, in FIG. 11, each histogram $h_p$ with p= 0 ... N−1 (N=16) is processed in turn. In step S400, p is set 0.

Then, in step S410, the value of p is examined for the selection of the appropriate functions for the processing of $h_p$. This selection may, for example, proceed along the lines illustrated in FIG. 5, where two sets of transforms, designated A and B, are used, with A selected when p=0, 2, 5, 7, 8, 10, 13, 15 and B selected when p=1, 3, 4, 6, 9, 11, 12, 14. This, however, is not restrictive, and a different number of sets of transform functions, and with a different spatial arrangement, may be employed so that the set of transform functions used in the processing of a gradient histogram exhibits differences to the sets of transform functions used in the processing of some of the gradient histograms which are neighbouring said histogram.

Then, in step S420, histogram $h_p$ of n bins (n=8) is transformed to descriptor $v_p$ of k elements (k=8), using the suitably selected set of transform functions. The sets of transform functions A and B may be defined as per (12) and (13) respectively shown below, where each set of functions is selected to capture the relations between bins which have a plurality of angular separations, and there are no common functions between A and B.

$$v_0 = h_2 - h_6$$
$$v_1 = h_3 - h_7$$
$$v_2 = h_0 - h_1$$
$$v_3 = h_2 - h_3$$
$$v_4 = h_4 - h_5$$
$$v_5 = h_6 - h_7$$
$$v_6 = (h_0 + h_4) - (h_2 + h_6)$$
$$v_7 = (h_0 + h_2 + h_4 + h_6) - (h_1 + h_3 + h_5 + h_7) \quad (12)$$
$$v_0 = h_0 - h_4$$
$$v_1 = h_1 - h_5$$
$$v_2 = h_1 - h_2$$
$$v_3 = h_3 - h_4$$
$$v_4 = h_5 - h_6$$
$$v_5 = h_7 - h_0$$
$$v_6 = (h_1 + h_5) - (h_3 + h_7)$$
$$v_7 = (h_0 \pm h_1 \pm h_2 \pm h_3) - (h_4 \pm h_5 \pm h_6 \pm h_7) \quad (13)$$

Alternatively, either or both sets of functions as shown in (12) and (13) may be replaced by different functions which capture the relations between bins which have another plurality of angular separations, or functions which result in a descriptor with a different number of elements k, with k=n or k<n or k>n. Furthermore, the sets of functions A and B may contain no common functions, or may contain some common functions. Furthermore, the bins among which values corresponding to relations are calculated may be selected according to different criteria for either or both of the sets of functions A and B. Such criteria, as seen earlier, may include selecting the bins among which values corresponding to relations are to be calculated so as to increase the discriminative power of the resultant values, or selecting the bins among which values corresponding to relations are to be calculated through a random selection process. Furthermore, any mixture of said criteria may also be used in the selection of either or both of the sets of functions A and B.

Then, in step S430, each element of the descriptor $v_p$ of k elements is individually quantised to q levels, giving the quantised descriptor $\tilde{v}_p$, in an analogous manner as for the third embodiment.

Then, in step S440 the value of p is examined and, if it is equal to the index of the last histogram in H, the process ends, otherwise it is incremented by 1 in step S450 and processing returns to step S410.

Clearly, alternative implementations may change the order or certain operations as appropriate compared to FIG. 11 without deviating from the scope of the invention, so example by first calculating the entire descriptor V and then proceeding with the quantisation to generate the quantised descriptor $\tilde{V}$.

Thus, the resultant descriptor $\tilde{V}$ encodes discriminative information of H. The utilisation of multiple sets of transformation functions as per this embodiment has a significant advantage over the utilisation of the same transformation functions in all the subregion histograms. It is known to those skilled in the art that with histogram of gradient based image descriptors, neighbouring gradient histograms exhibit significant correlation, which is maintained in the transformed gradient histogram descriptors and, in combination with coarse scalar quantisation, results in an increased probability of neighbouring transformed histograms having identical elements. This problem is alleviated by the utilisation of different transformation functions as per this embodiment, which increases the entropy and consequently the discriminative power of the descriptor.

The subsequent processing of the resultant descriptor may then proceed in an analogous fashion to the previous embodiments.

Fifth Embodiment

Figure 12:
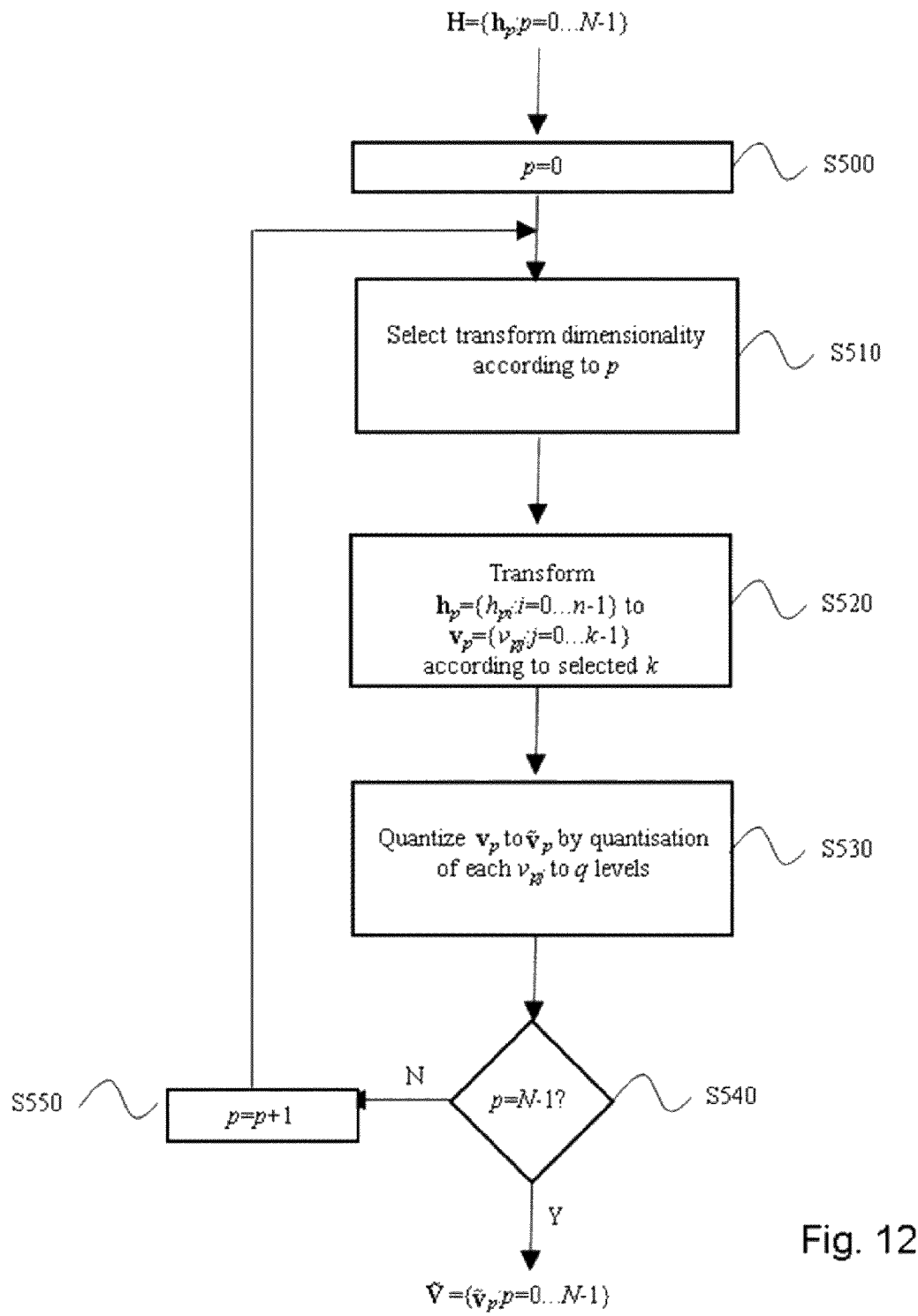

A fifth embodiment of the invention is illustrated in FIG. 12, where a gradient histogram based descriptor H comprising gradient histograms $h_p$, for example according to FIG. 4, is processed by transforming each gradient histogram $h_p$ by calculating values corresponding to relations between gradient histogram bins and so that the transformed gradient histogram descriptors of some subregions comprise a different number of elements to the transformed gradient histogram descriptors of other subregions.

More specifically, in FIG. 12, each histogram $h_p$ with p= 0 ... N−1 (N=16) is processed in turn. In step S500, p is set 0.

Then, in step S510, the value of p is examined for the selection of the appropriate dimensionality for the processing of $h_p$. This selection may, for example, proceed along the lines illustrated in FIG. 6, where the central subregion histograms with p=5, 6, 9, 10 are to be transformed so that the resultant descriptors have $k_c$ elements each ($k_c$=3) and the boundary subregion histograms with p=0, 1, 2, 3, 4, 7, 8, 11, 12, 13, 14, 15 are to be transformed so that the resultant descriptors have $k_b$ elements each ($k_b$=2). This, however, is not restrictive, and a different number possible dimensionalities, and with a different spatial arrangement, may be employed.

Then, in step S520, histogram $h_p$ of n bins (n=8) is transformed to descriptor $v_p$ by calculating values corresponding to relations between gradient histogram bins according to the functions of (14) shown below $v_0 = h_0 - h_4$ (used for both central and boundary subregions)

$v_1 = h_1 - h_5$ (used for both central and boundary subregions)

$v_2 = (h_1 + h_5) - (h_3 + h_7)$ (used only for central subregions) \quad (14)

Clearly, this embodiment may be combined with any previous embodiment, and the transform functions of (14) may be replaced by transform functions selected according to any mixture of selection criteria as seen earlier and/or different sets of transform functions may be used for different subregion histograms.

Then, in step S530, each element of the descriptor $v_p$ of k elements is individually quantised to q levels, giving the quantised descriptor $\tilde{v,}_p$, in an analogous manner as for the third and fourth embodiment.

Then, in step S540 the value of p is examined and, if it is equal to the index of the last histogram in H, the process ends, otherwise it is incremented by 1 in step S550 and processing returns to step S510.

Clearly, alternative implementations may change the order or certain operations as appropriate compared to FIG. 12 without deviating from the scope of the invention, so example by first calculating the entire descriptor V and then proceeding with the quantisation to generate the quantised descriptor $\tilde{V,}$.

Thus, the resultant descriptor $\tilde{V,}$ encodes discriminative information of H in a manner which gives more prominence to those parts of H which may be more important in establishing or verifying visual correspondences, such as the central subregion histograms versus the boundary subregion histograms, by allowing a representation of increased dimensionality for those parts.

Sixth Embodiment

Figure 13:
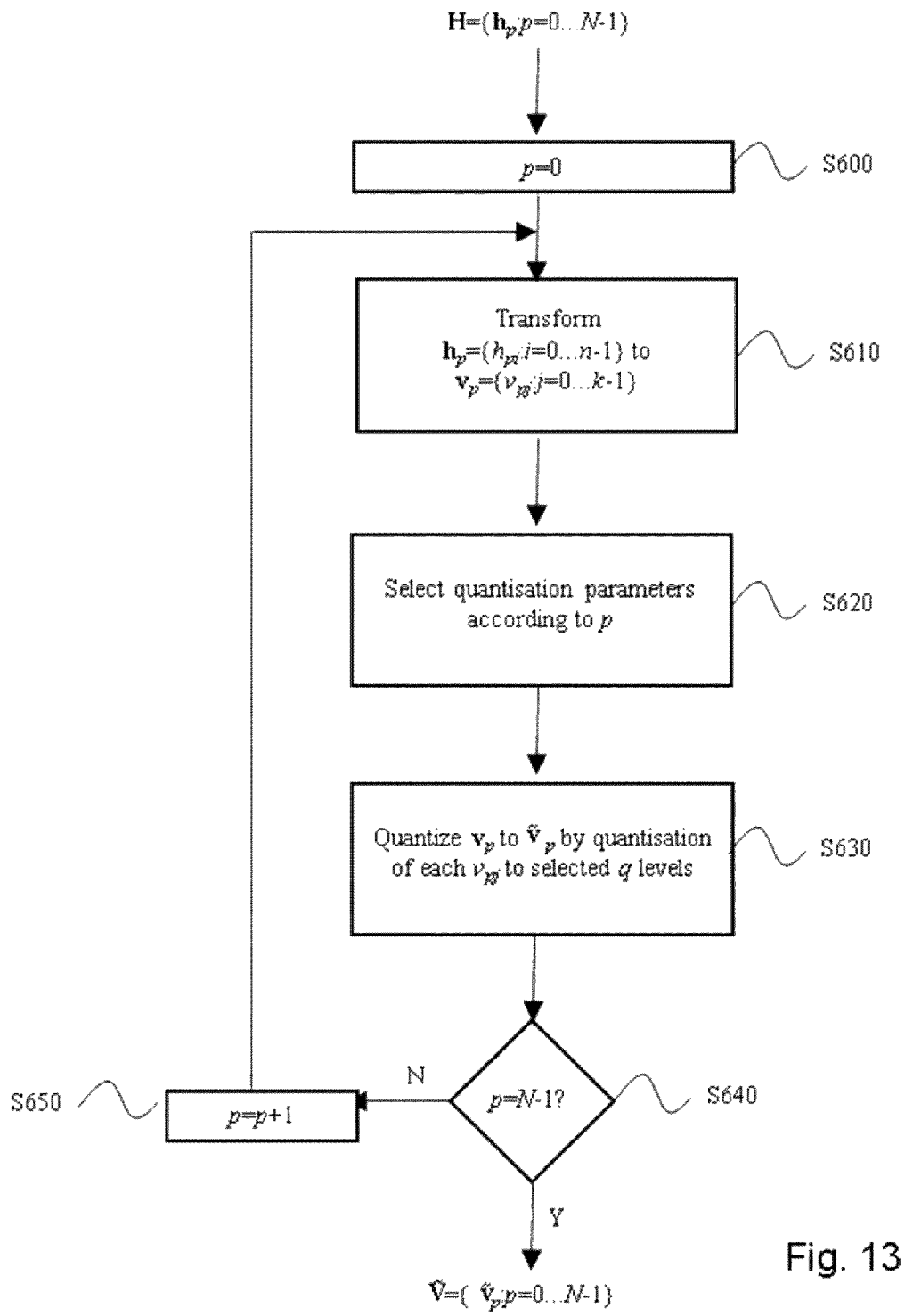

A sixth embodiment of the invention is illustrated in FIG. 13, where a gradient histogram based descriptor H comprising gradient histograms $h_p$, for example according to FIG. 4, is processed by transforming each gradient histogram $h_p$ by calculating values corresponding to relations between gradient histogram bins and so that some transformed gradient histogram descriptor elements are quantised to a different number of levels from other transformed gradient histogram descriptor elements.

More specifically, in FIG. 13, each histogram $h_p$ with p= 0 ... N−1 (N=16) is processed in turn. In step S600, p is set 0.

Then, in step S610, histogram $h_p$ of n bins (n=8) is transformed to descriptor $v_p$ of k elements (k=8) by a set of functions selected to capture the relations between bins as shown in (15) below.

$v_0 = h_2 - h_6$ $v_1 = h_3 - h_7$ $v_2 = h_0 - h_1$ $v_3 = h_2 - h_3$ $v_4 = h_4 - h_5$ $v_5 = h_6 - h_7$ $v_6 = (h_0 + h_4) - (h_2 + h_6)$ $v_7 = (h_0 + + h_4 + h_6) - (h_1 + + + h_7)$ (15)

Clearly, this embodiment may be combined with any previous embodiment, and the transform functions of (15) may be replaced by transform functions selected according to any mixture of selection criteria as seen earlier and/or different sets of transform functions may be used for different subregion histograms and/or different transformed descriptor dimensionalities may be used for different subregion histograms.

Then, in step S620, the value of p is examined for the selection of the appropriate number of quantisation levels for the quantisation of each element $v_{pj}$. This selection may, for example, proceed along the lines illustrated in FIG. 7, where the central subregion descriptors with p=5, 6, 9, 10 are to be quantised to $q_e$ levels ($q_e$=4) and the boundary subregion descriptors with p=0, 1, 2, 3, 4, 7, 8, 11, 12, 13, 14, 15 are to be quantised to $q_b$ levels ($q_b$=2). This, however, is not restrictive, and a different number of possible quantisation levels, and with a different spatial arrangement, may be employed. Furthermore, although this is not shown in FIG. 13, the number of quantisation levels for each element $v_{pj}$ may be determined according to the value of j, i.e., according to the specific type of descriptor element, instead of or in addition to the value of p, i.e., the subregion location of the element.

Then, in step S630, each element of the descriptor $v_p$ of k elements is individually quantised to the appropriate number of quantisation levels, giving the quantised descriptor $\tilde{v,}_p$, in an analogous manner as for the third, fourth and fifth embodiment.

Then, in step S640 the value of p is examined and, if it is equal to the index of the last histogram in H, the process ends, otherwise it is incremented by 1 in step S650 and processing returns to step S610.

Clearly, alternative implementations may change the order or certain operations as appropriate compared to FIG. 13 without deviating from the scope of the invention, so example by first calculating the entire descriptor V and then proceeding with the quantisation to generate the quantised descriptor $\tilde{V,}$.

Thus, the resultant descriptor $\tilde{V,}$ encodes discriminative information of H in a manner which gives higher representation accuracy to those parts of H or those elements of V which may be more important in establishing or verifying visual correspondences.

Figure 15:
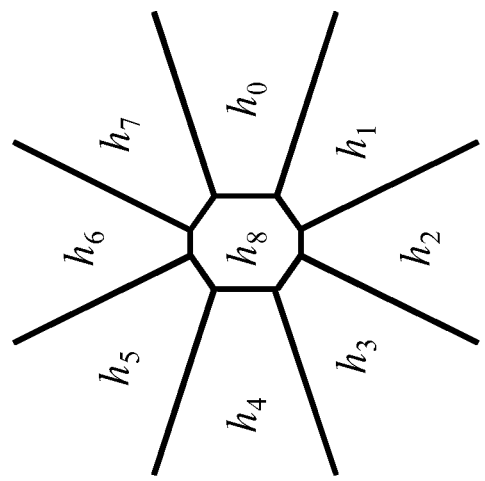
Figure 14:
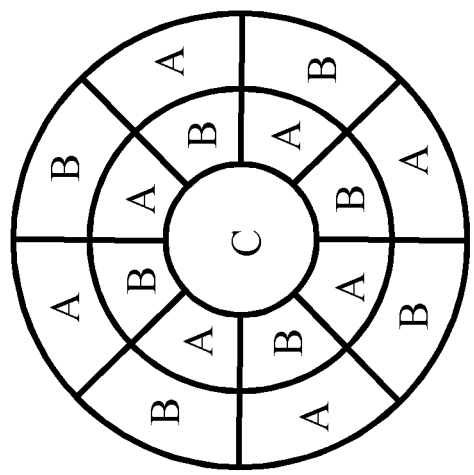
FIG. 14 illustrates the processing of an image descriptor according to the invention by using the spatial subdivision scheme of FIG. 2b.

Although aspects and embodiments of the present invention are presented in detail for the computation of robust, discriminative, scalable and compact image descriptors from a SIFT image descriptor as illustrated in FIG. 4, the invention is applicable to other image descriptors based on histograms of gradients. For example, FIG. 14 illustrates the processing of a gradient histogram based descriptor using a log-polar spatial subdivision by transforming each of its gradient histograms with a set of transform functions which exhibits differences to the sets of transform functions used in the processing of its neighbouring gradient histograms, in a manner analogous to the fourth embodiment of the invention and with the symbols A, B, and C in FIG. 14 corresponding to said sets of transform functions. As another example, for a histogram of gradients based on a subdivision of the 2-dimensional space of the x and y components of the gradients into bins as illustrated in FIG. 15, one suitable set of transformation functions in a manner analogous to previous embodiments of the invention is $v_0 = h_0 - h_1$ $v_1 = h_1 - h_2$ $v_2 = h_2 - h_3$ $v_3 = h_3 - h_4$ $v_4 = h_4 - h_5$ $$v_5 = h_5 - h_6$$

$$v_6 = h_6 - h_7$$

$$v_7 = h_7 - h_0$$

$$v_8 = h_8 - (h_0 + h_1 + h_2 + h_3 + h_4 + h_5 + h_6 + h_7) \qquad (16)$$

Furthermore, the invention is also applicable to suitably processed histogram of gradient based image descriptors. Such suitable processing may entail, for example, the combination of subregion gradient histograms prior to processing according to the invention.

For illustrative purposes only, referring to FIG. 4a, for the gradient histogram descriptor H comprising subregion histograms $h_p$ with p=0 ... 15, the histograms with p=0, 1, 4, 5 may be combined into a single subregion histogram by the averaging of their bin values, and an analogous combination may be performed for the histograms with p=2, 3, 6, 7 and p=8, 9, 12, 13 and p=10, 11, 14, 15, resulting in a gradient histogram descriptor with reduced dimensionality which may then be processed according to any previous embodiment of the invention. The gradient histograms may also be combined by an alternative function of their bin values, such as the sum.

Alternatively, or in addition, such suitable processing may entail, for example, the merging of bins within subregion gradient histograms. For illustrative purposes, referring to FIG. 4b, for the gradient histogram h, neighbouring bins may be merged into a single bin by the averaging or addition or median or any suitable function, resulting in a gradient histogram descriptor with reduced dimensionality which may then be processed according to any previous embodiment of the invention.

Figure 16:
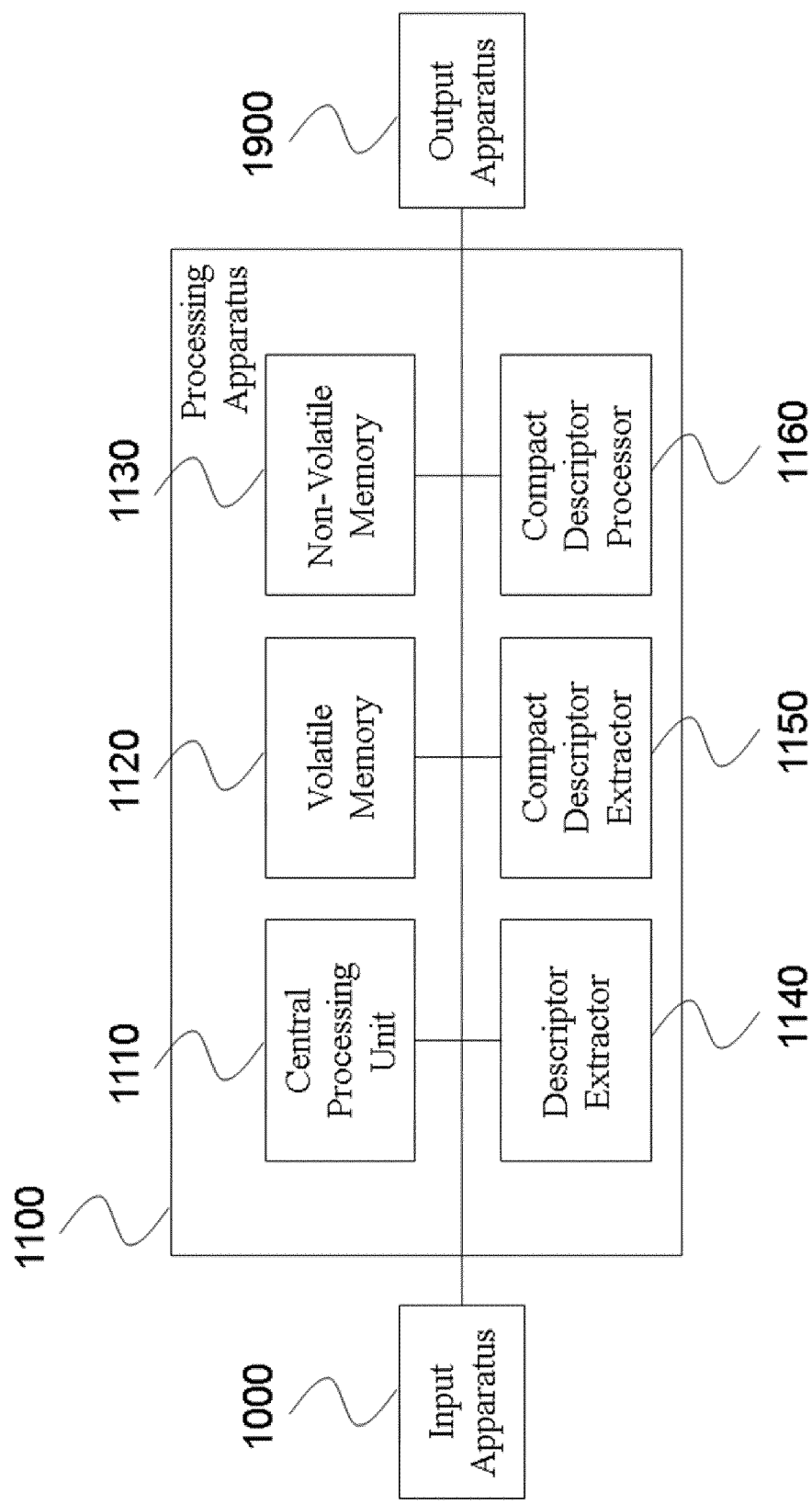
FIG. 16 illustrates an image processing device suitable for carrying out the method according to the present invention.

By way of example only, FIG. 16 illustrates a conceptual processing apparatus for carrying out the method according to the present invention. More specifically, processing apparatus 1100 receives input, which may comprise visual data, such as image or video data, pre-calculated descriptors based on histograms of gradients, pre-calculated compact descriptors according to the method of the present invention, programming instructions, or user input, from input apparatus 1000, which may take the form of a user input apparatus, a media reader, or a receiver of transmitted signals. The processing apparatus 1100 comprises the main processing blocks of a central processing unit 1110 which controls the operations of the other processing blocks, volatile memory 1120, non-volatile memory 1130, optionally a descriptor extractor block 1140 configured to generate descriptors based on histograms of gradients, a compact descriptor extractor block 1150 configured to carry out the method according to the present invention, and optionally a compact descriptor processor block 1160 configured to process said compact descriptors, for example to establish or verify visual correspondences. Processing apparatus 1100 is connected to output apparatus 1900, which may take the form of a visual display unit, a media writer, or a transmitter of signals, which provides output which may comprise annotated visual data, such as image or video data, processing information such as established or verified visual correspondences, or calculated compact descriptors according to the method of the present invention. It should be understood that the processing blocks and architecture shown in FIG. 16 are only conceptual and may not correspond exactly to every apparatus implementing the method according to the invention. The method for transforming an image descriptor based on a gradient histogram and a relative image processing apparatus described herein by way of example may be subject to many possible variations without departing from the novelty spirit of the inventive idea; it is also clear that in the practical implementation of the invention the illustrated details may have different shapes or be replaced with other technically equivalent elements.

It can therefore be easily understood that the present invention is not limited to a method for transforming an image descriptor based on a gradient histogram and a relative image processing apparatus, but may be subject to many modifications, improvements or replacements of equivalent parts and elements without departing from the inventive idea, as clearly specified in the following claims.

The invention claimed is:

1. A method for transforming an image descriptor, for controlling information content and discriminative power of the image descriptor against storage and/or transmission costs of the image descriptor, the method comprising:
receiving an image descriptor based on a gradient histogram, the gradient histogram comprising a plurality of histogram bins containing a first set of values that are calculated at image sample points in a region around an image keypoint and accumulated into orientation histograms summarizing the contents over image subregions;
applying at least one location criterium of said histogram bins for transforming said gradient histogram, wherein said location criterium provides for calculating a second set of values representative of image sample points around said image key point derived from gradient histogram bins which exhibit a plurality of angular separations;
generating a transformed image descriptor comprising said second set of values.

2. The method according to claim 1, wherein at least one of said second values is calculated based on adjacent histogram bins.

3. The method according to claim 1, wherein said second values are individually quantised to a plurality of levels, wherein said plurality of levels may be the same for each value or may be different for at least two values.

4. The method according to claim 1, wherein said second values are calculated according to one or more of the following operations: sums or differences between histogram bins; differences between sums of histogram bins; linear or non-linear operations between histogram bins; ratios between histogram bins; ratios between sums of histogram bins; ratios between products of histogram bins; differences between products of histogram bins.

5. The method according to claim 1, wherein said gradient histogram has a dimensionality of a first number of elements, said set of second values has a dimensionality of a second number of elements, and said first number of elements equals said second number of elements.

6. The method according to claim 1, wherein said gradient histogram has a dimensionality of a first number of elements, said set of second values has a dimensionality of a second number of elements, and said first number of elements is greater than said second number of elements.

7. The method according to claim 1, wherein said gradient histogram has a dimensionality of a first number of elements, said set of second values has a dimensionality of a second number of elements, and said first number of elements is lower than said second number of elements.

8. A method for transforming an image descriptor into a transformed image descriptor, the method comprising:
receiving an image descriptor based on a plurality of gradient histograms; wherein each of said plurality of gradient histograms is related to a subregion of a local region around an image keypoint;

transforming each of said gradient histograms comprising a plurality of histogram bins into a plurality of transformed gradient histogram bins according to the method of claim 1.

9. The method according to claim 8, wherein at least one subregion gradient histogram is transformed differently to other subregion gradient histograms.

10. The method according to claim 9, wherein a plurality of subregion gradient histograms are combined in a single subregion histogram, in particular by summing or averaging their bin values.

11. The method according to claim 9, wherein the operations employed to obtain said at least one transformed subregion gradient histogram differ at least partially from the operations employed to obtain the transformed subregion gradient histograms of at least one of its neighbouring subregions.

12. The method according to claim 9, wherein said at least one transformed subregion gradient histogram comprises a different number of elements than the transformed subregion gradient histograms of at least one of its neighbouring subregions.

13. The method according to claim 12, wherein the transformed subregion gradient histograms relative to the subregions directly surrounding said image keypoint comprise more elements than the elements of the transformed gradient histograms of remaining subregions.

14. The method according to claim 13, wherein the elements of said transformed gradient histograms of subregions directly surrounding said image keypoint are quantised with a number of levels which is greater than the number of levels with which the transformed gradient histograms of remaining subregions are quantised.

15. The method according to claim 14, wherein said quantisation is applied only to specific elements of said subregion gradient histograms.

16. The method according to claim 8, wherein said transformed image descriptor is subject to a quantisation process in order to generate a quantised transformed image descriptor.

17. An image processing apparatus configured to transform at least one image descriptor into a transformed image descriptor, for controlling information content and discriminative power of the image descriptor against storage and/or transmission cost of the image descriptor, the image processing apparatus comprising:

a memory unit for storing image data comprising at least one image descriptor based on a gradient histogram, comprising a plurality of histogram bins containing a first set of values, calculated at image sample points in a region around an image keypoint and accumulated into orientation histograms summarizing the contents over image subregions;

a processing unit operatively connected to said memory unit, configured to:

apply at least one location criterium of said histogram bins for transforming at least one of said gradient histograms, wherein said location criterium provides for calculating a second set of values representative of image sample points around said image keypoint derived from gradient histogram bins which exhibit a plurality of angular separations, and generate a transformed image descriptor comprising said second set of values.

* * * * *